Patented Dec. 23, 1941

2,267,248

UNITED STATES PATENT OFFICE 2,267,248

HYDROXYLATION OF UNSATURATED OILS, FATS, GLYCERIDES, AND RELATED PRODUCTS

Nicholas A. Milas, Belmont, Mass., assignor to Research Corporation, New York, N. Y., a corporation of New York No Drawing. Application March 3, 1939, Serial No. 259,674

8 Claims. (Cl. 260—406)

This invention relates to the catalytic hydroxylation of unsaturated organic compounds, and is particularly concerned with the provision of a simple, economical and efficient process of producing useful hydroxylated organic compounds from unsaturated plant and animal glycerides, oils, fats, and related compounds. This application is a continuation-in-part of my copending application Serial No. 136,600.

In essence, the process of the present invention comprises reacting the plant (or animal) glyceride (or oil or fat) with hydrogen peroxide in the presence of a suitable catalyst and in an essentially anhydrous solvent medium. The resulting hydroxylated product is thereafter recovered from the mixture by removing the solvents under reduced pressure and concentrating in known manner.

The starting material may be any unsaturated plant glyceride or unsaturated animal glyceride, e. g., a glyceride of cottonseed, linseed, olive, palm or tung oil, a glyceride of any one of various fish liver oils (e. g., cod liver oil, halibut oil, shark liver oil, or the like) or a glyceride of an animal fat. The glyceride may be present in the solution preferably in the ratio of one mol to one or two mols of the hydrogen peroxide: excess of the peroxide over the 1 to 2 ratio favors formation of aldehydic, ketonic and/or acidic products.

Suitable catalysts include: vanadium oxides, osmium tetroxide, ruthenium tetroxide, chromic anhydride, molybdenum oxide, and, in general, an oxide of a metal which assumes varied valences. The catalyst may be added to the reactants or to one of them or to the solvent medium in a powdered or finely divided solid state, or it may be prepared by first dispersing it, in substantially anhydrous state, in substantially pure solvent medium (e. g., anhydrous pure tertiary butyl alcohol). If added in dry solid state the catalyst eventually dissolves, forming a completely homogeneous solution in the solvent medium and in the reaction mixture. The speed of the reaction,— up to certain limits,—depends upon the concentration of the catalyst: preferably, the catalyst is employed in an amount ranging from about 0.05 to about 0.5 g. per mol of the starting material, although these limits are not strictly critical and may at times be exceeded without appreciably affecting the reaction.

Suitable solvent media include: essentially anhydrous alcohols, such, for instance, as tertiary butyl, or tertiary amyl, alcohol; an essentially anhydrous saturated low boiling ether such as ethyl or propyl or butyl ether; or dioxane; or a nitrile, e. g., acetonitrile; or the like.

In effecting the reaction above described the solution of reactants (plus catalyst) may be and preferably is maintained at or below normal room temperature until hydroxylation has reached a maximum (or has reached a desired point short of maximum), but may be maintained at above normal room temperature: maintenance of the temperature of the mixture at or below normal room temperature favors production of glycols, while maintenance of elevated temperature favors production of aldehydic, ketonic and/or acidic products.

By the carrying out of the present process the glycerides of fish liver oils not only are hydroxylated but also are freed (wholly, or in part) from disagreeable and undesirable odors, thus making the hydroxylated products useful in the various arts and as well for possible food consumption.

The degree of hydroxylation effected may be followed by determining the iodine number using the method recommended by Hübl. To demonstrate conclusively that hydroxylation has occurred, the hydroxyl hydrogen is determined by the method of Zerewitinoff both before and after the reaction, and appropriate correction is made for the presence of organic acid as determined by titration with standard alkali. If the organic acids are carefully removed, most of the animal and vegetable oils have very low, or zero, Zerewitinoff number before hydroxylation.

In the following table are set forth the representative results of a number of specific examples embodying the present invention.

TABLE I

HYDROXYLATION OF OILS

| Oil | I₂ No. Before | I₂ No. After | Double bonds in hydroxylated oil mols/100 g. oil | Acid in hydroxylated oil eq./100 g. oil | Catalyst | Percent peroxide solution | Room temperature reaction, time in days | Mols of peroxide used/mols double bonds consumed |
|---|---|---|---|---|---|---|---|---|
| A | 101 | 67 | 0.26 | | a | 7.5 | 1 | 1.1 |
| A | 101 | 17 | 0.06 | | a | 7.5 | 3 | 2.7 |
| B | 110 | 28 | 0.11 | | a | 7.5 | 5 | 1.0 |
| B | 110 | 81 | 0.32 | | a | 5.6 | 5 | 1.1 |
| B* | 110 | 12 | 0.05 | 0.138 | a | 7.5 | 3 | 2.6 |
| B | 110 | 61 | 0.24 | 0.066 | b | 7.5 | 3 | 2.5 |
| B | 110 | 46 | 0.18 | | c | 7.5 | 9 | 2.5 |
| C | 162 | 35 | 0.14 | | a | 7.5 | 25 | 1.76 |
| D | 150 | 35 | 0.14 | | a | 7.5 | 20 | 1.80 |
| E** | 161 | 22 | 0.09 | 0.19 | a | 7.5 | 30 | 1.78 |
| F | 140 | 51 | 0.20 | 0.11 | a | 7.5 | 5 | 2.0 |
| F | 140 | 62 | 0.24 | 0.055 | b | 7.5 | 7 | 2.0 |
| F | 140 | 42 | 0.17 | | c | 7.5 | 7 | 2.0 |
| G | 87 | 45 | 0.18 | | a | 7.5 | 6 | 3.3 |

In the above table A represents Wesson oil; B represents a cottonseed oil; C represents a linseed oil; D represents a dark grade of a shark liver oil; E represents a light grade of a shark liver oil; F represents a cod liver oil; and G represents an olive oil. Under "Catalyst," $a$ represents $V_2O_5$; $b$ represents $CrO_3$; and $c$ represents $OsO_4$.

It is noted that in the experiments marked * and ** it was found that 0.66 and 0.84, respectively, represented the value of active H in hydroxylated oil eq./100 g. oil.

The end products are non-volatile, highly viscous liquids. Hydroxylation of fish liver oils brings about disappearance of most or all of the "fishy" odor; it greatly improves the taste of fish liver oils and linseed oil.

The invention will be more specifically described by recourse to the following illustrative,— but not restrictive,—example:

Example

Ten grams of cotton seed oil ($I_2$ No.=110) was mixed with 50 cc. of 7.5 $H_2O_2$ in tertiary butyl alcohol, and to the mixture was added 0.1 g. of vanadium pentoxide catalyst. The mixture was then allowed to stand at room temperature for 3 days when most of the peroxide had disappeared as determined by titration. The solvent was then removed at room temperature, under reduced pressure, and the product, which was a highly viscous oil, was titrated for the presence of acids (found 0.138 equiv. per 100 g. of product) and the iodine number was determined ($I_2$ No.= 12). Unsaturation was calculated as 0.05 mols per 100 g. of product.

To determine the amount of hydroxylation of the product by the Zerewitinoff method, it was necessary to remove the organic acids thoroughly, dry the product, then treat a weighed amount of the dried product with methyl magnesium iodide, and determine quantitatively the amount of methane formed. From the results obtained, it was estimated that the viscous product contained 0.66 equivalent of hydroxyl hydrogen per 100 g. of the product.

I claim:

1. Process of hydroxylating an unsaturated glyceride which comprises treating the glyceride with a solution of substantially anhydrous hydrogen peroxide in a substantially anhydrous and essentially inert organic solvent for the glyceride, in the presence of catalytically active oxide of a metal of the group consisting of vanadium, osmium, chromium, cerium, tungsten, molybdenum, and ruthenium.

2. Process of hydroxylating the unsaturated glycerides of vegetable and animal oils and fats which comprises treating the unsaturated glyceride-containing material with a solution of substantially anhydrous hydrogen peroxide in an inert, substantially anhydrous organic solvent for the glycerides, in the presence of a catalytically active oxide of a metal of the group consisting of vanadium, osmium, chromium, cerium, tungsten, molybdenum and ruthenium.

3. Process of hydroxylating an unsaturated glyceride contained in a naturally occurring oil or fat which comprises dissolving the oil or fat in a substantially anhydrous and inert organic solvent therefor, adding to the solution a catalytically active oxide of a metal of the group consisting of vanadium, osmium, chromium, cerium, tungsten, molybdenum, and ruthenium and substantially anhydrous hydrogen peroxide in an amount at least equal molecularly to the amount of the glyceride, and effecting reaction between the glyceride and the hydrogen peroxide.

4. Process of hydroxylating an unsaturated glyceride in a naturally occurring oil or fat which comprises mixing the oil or fat in the presence of a substantially anhydrous tertiary alcohol containing not more than 5 carbon atoms with substantially anhydrous hydrogen peroxide and a catalytically active oxide of a metal of the group consisting of vanadium, osmium, chromium, cerium, tungsten, molybdenum and ruthenium, the glyceride and the peroxide being present in the mixture in the ratio of one mol of the former to at least one mol of the latter, effecting reaction between components of the mixture, and recovering the hydroxylated product.

5. Process of hydroxylating an unsaturated glyceride in a naturally occurring oil or fat which comprises mixing the oil or fat with a substantially anhydrous and inert organic solvent therefor containing substantially anhydrous hydrogen peroxide and in the presence of a catalytically active oxide of a metal of the group consisting of vanadium, osmium, chromium, cerium, tungsten, molybdenum and ruthenium.

6. Process of hydroxylating an unsaturated glyceride in a naturally occurring oil or fat which comprises mixing the oil or fat with a substantially anhydrous and inert organic solvent therefor containing substantially anhydrous hydrogen peroxide and in the presence of catalytically active vanadium pentoxide.

7. Process of hydroxylating an unsaturated glyceride in a naturally occurring oil or fat which comprises mixing the oil or fat with a substantially anhydrous and inert organic solvent therefor containing substantially anhydrous hydrogen peroxide and in the presence of catalytically active osmium tetroxide.

8. Process of hydroxylating an unsaturated glyceride in a naturally occurring oil or fat which comprises mixing the oil or fat with a substantially anhydrous and inert organic solvent therefor containing substantially anhydrous hydrogen peroxide and in the presence of catalytically active chromium trioxide.

NICHOLAS A. MILAS.